United States Patent
Risgaard et al.

(10) Patent No.: US 6,357,172 B1
(45) Date of Patent: Mar. 19, 2002

(54) PLANT PROTECTOR

(75) Inventors: Michael R. Risgaard; Thomas Frank, both of Baraboo, WI (US)

(73) Assignee: Teel Plastics, Inc., Baraboo, WI (US)

( * ) Notice: Subject to any disclaimer, the term of this patent is extended or adjusted under 35 U.S.C. 154(b) by 0 days.

(21) Appl. No.: 08/872,601

(22) Filed: Jun. 10, 1997

(51) Int. Cl.$^7$ .............................................. A01G 13/10
(52) U.S. Cl. ........................................................ 47/23
(58) Field of Search ............................. 47/32.1, 80, 86, 47/21, 32, 23, 30, 300 T; 220/4.21, 4.22, 4.23, 4.24; 229/406, 407; 206/303, 445; 426/106, 128

(56) References Cited

U.S. PATENT DOCUMENTS

| | | | | |
|---|---|---|---|---|
| 2,091,126 A | * | 8/1937 | Speer | 229/406 |
| 2,798,784 A | * | 7/1957 | Marshall | 220/4.21 |
| 3,128,030 A | * | 4/1964 | Davies | 229/406 |
| 3,164,478 A | * | 1/1965 | Bostrom | 220/4.21 |
| 3,276,176 A | * | 10/1966 | Jonsson et al. | 206/445 |
| 3,507,417 A | * | 4/1970 | McCarthy et al. | 220/5 |
| 3,557,489 A | * | 1/1971 | Ferrand | 47/37 |
| 3,786,982 A | * | 1/1974 | Rakes et al. | 229/2.5 |

(List continued on next page.)

FOREIGN PATENT DOCUMENTS

| | | | | |
|---|---|---|---|---|
| AU | 227225 | * | 3/1957 | 47/30 |
| EP | 490620 | * | 12/1991 | 47/23 |
| EP | 93 304556.2 | | 9/1993 | |
| EP | 91 908774 | | 4/1996 | |
| GB | 132134 | * | 9/1919 | 47/32.1 R |
| GB | 2104366 | * | 3/1983 | 47/300 T |
| GB | 2222927 | | 3/1990 | |
| WO | PCT/GB95/00493 | | 9/1995 | |

OTHER PUBLICATIONS

Advertisement for "The Treesleeve" by Mer/Nel Co., Citograph, Jul. 1996, p. 11.
Printout of Web page for "The Little Red TreePee Plus" by Bailey's, printout dated Feb. 14, 1997.
Brochure entitled "Treessentials® Solutions . . . Introducing Supertube™", 1994.
Advertisement for Vine Shelters by Pacific Western Container, Grape Grower, Aug. 1996, p. 16.

* cited by examiner

*Primary Examiner*—Michael J. Carone
*Assistant Examiner*—Fredrick T. French, III
(74) *Attorney, Agent, or Firm*—Foley & Lardner (57) ABSTRACT

A plant protector is positionable about the base of a young tree or other plant. The protector has first and second shells, each formed of a rigid material and having a semi-cylindrical shaped portion and with flanges extending outwardly from and running longitudinally along the semi-cylindrical portions. Each semi-cylindrical portion may have raised circumferential ribs which are spaced apart at regular intervals to increase strength and rigidity. The opposed flanges abut and the semi-cylindrical portions form a cylindrical tube when the shells are engaged together. The shells are locked together by locking structures formed on at least one of the flanges of the shells. The shells may be held together at one edge by a hinge extending longitudinally along edges of the shells. Various locking structures may be used, such as mating bosses and indentations formed on the flanges on opposite sides of the first and second shells.

9 Claims, 11 Drawing Sheets

U.S. PATENT DOCUMENTS

| | | | |
|---|---|---|---|
| D231,367 S | * 4/1974 | Willinger et al. | D30/1 |
| 3,826,040 A | 7/1974 | Roberts et al. | |
| 3,835,994 A | * 9/1974 | Davis et al. | 206/499 |
| 4,057,932 A | * 11/1977 | Spencer | 47/77 |
| 4,135,625 A | * 1/1979 | Merrill | 206/445 |
| 4,234,080 A | * 11/1980 | Gellert | 206/445 |
| 4,240,544 A | * 12/1980 | Barnhart et al. | 206/445 |
| 4,248,014 A | * 2/1981 | Williames | 47/86 |
| 4,268,992 A | 5/1981 | Scharf, Sr. | |
| 4,408,763 A | * 10/1983 | Simons | 206/445 |
| 4,512,474 A | * 4/1985 | Harding | 206/461 |
| 4,700,507 A | 10/1987 | Allen | |
| 4,715,492 A | * 12/1987 | Holmes | 206/445 |
| D298,998 S | 12/1988 | Hurlstone | |
| 4,829,707 A | 5/1989 | Koffler et al. | |
| 4,840,276 A | * 6/1989 | George | 206/499 |
| 4,845,889 A | 7/1989 | Taylor | |
| 4,899,486 A | 2/1990 | Hurlstone | |
| 4,922,652 A | * 5/1990 | Graves | 47/23 |
| 5,016,388 A | 5/1991 | Burress et al. | |
| 5,060,416 A | 10/1991 | Rohde | |
| 5,169,014 A | * 12/1992 | Hexamer | 220/4.22 |
| 5,263,278 A | 11/1993 | Valenti, Jr. | |
| 5,269,430 A | * 12/1993 | Schlaupitz et al. | 220/4.23 |
| B15,046,659 | * 2/1994 | Warburton | 229/2.5 R |
| 5,347,750 A | 9/1994 | Mills | |
| 5,375,368 A | 12/1994 | Motz, Jr. | |
| 5,471,783 A | 12/1995 | McLean | |
| 5,479,741 A | 1/1996 | Underwood | |
| 5,509,229 A | 4/1996 | Thomasson et al. | |
| 5,513,466 A | 5/1996 | Mercier | |
| 5,566,503 A | 10/1996 | Nickson | |
| 5,605,008 A | * 2/1997 | Johnston et al. | 47/21 |

PLANT PROTECTOR

FIELD OF THE INVENTION

This invention relates generally to shelters and protectors which are placed around young trees or other plants for the purposes of accelerating growth and preventing damage.

BACKGROUND OF THE INVENTION

Young trees, grapevines and other plants can be vulnerable to damage from small animals. To help prevent such damage, plant protectors have been wrapped around the base or trunk of the tree or other plant during its early growth. An example of such a protector is a cylindrical plastic tube which is placed around young trees, vines and other types of plants. These protectors can also act as mini-greenhouses to accelerate growth of the young plants. Placing a properly sized and colored tube around a young plant or tree has been shown to enhance plant growth. In the forestry industry, the tubes are used to accelerate growth and promote straight tree trunks. In the viticulture industry, the tubes are used to accelerate plant growth and reduce the time required before the first harvest. Studies have shown that appropriate shape, height, diameter, color, and venting of such tubes can all contribute to enhancing plant growth. Recently, studies have shown that grape vines benefit from the tube well after the vine is tied to the trellis. This discovery has promoted the design of grow tubes that can be removable. In hot climates, studies have concluded that venting of the grow tube by providing holes at selected positions in the tube can help reduce leaf-burn and promote a healthier plant. The disadvantage to such venting is that the vent holes allow herbicides to enter (and possibly damage) the root area.

As the tree or plant matures, the tube protectors may begin to engage the plant and inhibit growth. To remove the tube from around the tree or plant, the tube must be pulled off of the plant or the tube must be cut away, either of which might result in damage to the tree or plant. Cutting the tube usually prevents reuse of the tube on another plant.

Various plant or tree protectors have been developed in an attempt to protect young trees and plants from damage without the limitation of having to cut away the protector when the tree or plant has matured. One fairly common example of such a plant protector is a plastic sheet which is wrapped around the trunk of a tree, with its two ends joined by a coupling mechanism. The traditional coupling mechanism does not allow for the partial opening of the tree protector. A further disadvantage is that extended use can lead to the deformation of the tree protector. The tree protector may be positioned around the trunk of a tree for a relatively long period of time, sometimes several years, during which time it can tend to conform to the shape of the tree and may sag or otherwise lose its proper shape.

A wide variety of other types of tree protectors have been developed. These too have typically been difficult to remove and replace, and often have been too complex and expensive to be practical.

SUMMARY OF THE INVENTION

A plant protector for providing growth enhancement and protection against damage in accordance with the present invention includes first and second shells, each formed of a rigid plastic material having a semi-cylindrical shaped portion. The shells have flanges at the edges of the semi-cylindrical portions that run longitudinally. Each shell preferably also includes raised ribs running circumferentially in the semi-cylindrical portions, perpendicular to the flanges, and regularly spaced apart so as to provide strength and rigidity to the shells. The ribs face outwardly when the shells come together, and the flanges can be joined such that the shells form a cylindrical tube when engaged together. The shells may be conveniently locked together in place around a tree or other plant by a locking means on the flanges for locking the first shell to the second shell.

The plant protector may be placed around a tree or other plant without the concern that it will inhibit growth as the tree or plant matures because the protector can be easily removed by disengaging the locking means when it is appropriate to do so. Further, the locking means can comprise closures formed as snap-fit interlocking parts on the flanges that can be pulled apart by the growing tree, thereby limiting the pressure that can be applied by the plant protector to the growing tree.

The plant protector may be partially opened in order to expose part of the tree or plant for purposes of maintenance, repair, or diagnostics, and then reclosed. Some or all of the closures along the length of the protector may be disengaged, as the user may so desire.

The plant protector is preferably made of a rigid plastic material in order to resist attack by animals and to withstand an external impact (e.g., from a lawnmower). Due to the rigid structure and the two shell construction of the tree protector, when the tree protector is removed from around a tree, it retains its original shape and physical integrity, and may be applied to another tree or plant or disposed of.

The first and second shells are conveniently and preferably made by a vacuum forming process, using molds having the shape of each shell. As is conventional in vacuum forming, a flat sheet of plastic is heated to a softening temperature, and the softened plastic is drawn under vacuum into the mold, where the plastic cools and hardens into the shape defined by the mold.

The upper and lower edge sections of the semi-cylindrical portions preferably flare outwardly so as to allow room for root expansion at the lower edge, and branch expansion at the upper edge, and to minimize the chance that the top and bottom edges of the protector will chaff against the trunk.

The first and second shells are preferably connected by a locking means on the flanges of each of the shells. The use of a locking means on both edges of the shells is not required, however. The first and second shells may be engaged by a locking means at one edge of each of the first and second shells, and with the first and second shells having flanges terminating at a hinge (e.g., an integral "living hinge") at the other edge of each shell which joins the two shells. The locking means is preferably also a vacuum formed structure formed integrally on the flanges of the first and the second shells. The locking means may comprise several mating bosses and indentations formed on the flanges on opposite sides of the first and second shells and positioned periodically along the longitudinal edge of each flange. Alternatively, the locking means may comprise a longitudinally extending groove and a longitudinally extending ridge formed on the flanges on opposite sides of the first and second shells for locking the shells when the shells are engaged together. The locking means may also take the form of an overlapping lip on one of the flanges of the first shell that envelopes an edge of one of the flanges on the second shell such that the lip and the edge lock together, whereby a cylindrical tube is formed when the first shell and the second shell are engaged together.

The plant protector may also have one or more grooves formed on the semi-cylindrical portions for receiving a security stake for stabilizing the plant protector in the ground and one or more apertures at the top of the each flange for passing through a piece of rope to tie the shell portions together or to a stake.

The flanges on the two shells may be scalloped wherein an outwardmost part of one flange meets an inwardmost part of the abutting flange so that the flanges can be easily gripped to draw the shells apart or bring the flanges together.

Further, the plant protector of the invention may include at least one and preferably several tortuous path vent tubes that extend from the edges of the flanges to communication with the interior of the protector. The vent tubes may conveniently be formed as semi-cylindrical raised portions in the flat flanges, with the indentations in abutting flanges matching with each other to form a complete vent tube. The vent tubes preferably have an upwardly (or vertically) extending section in addition to (radially) inwardly extending sections. The vertical section helps to minimize the migration of liquid herbicides through the vent tubes into the interior of the protector.

Further objects, features and advantages of the invention will be apparent from the following detailed description when taken in conjunction with the accompanying drawings.

DETAILED DESCRIPTION OF THE INVENTION

Figure 1:
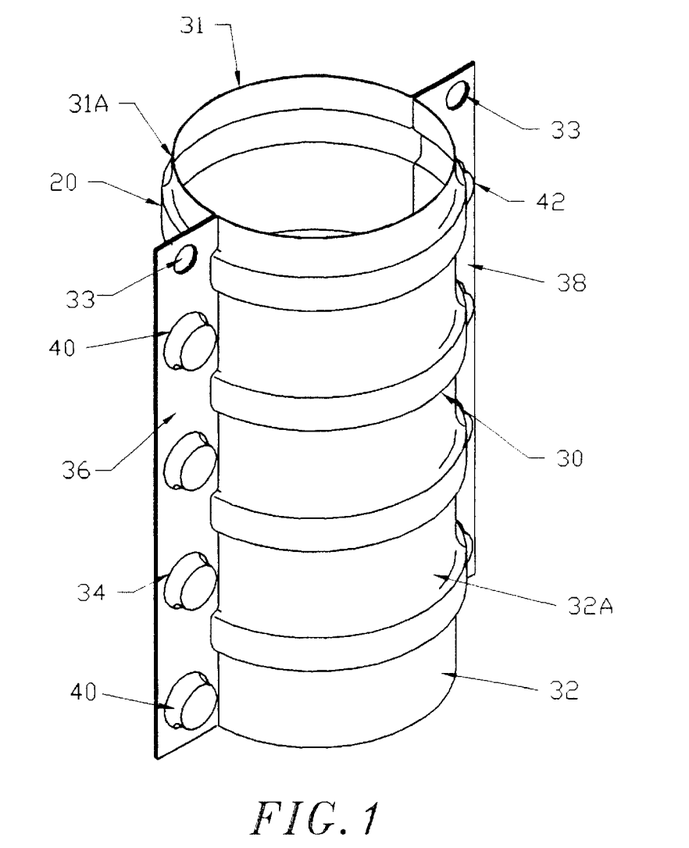
FIG. 1 is a perspective view of a plant protector in accordance with the present invention.
Figure 2:
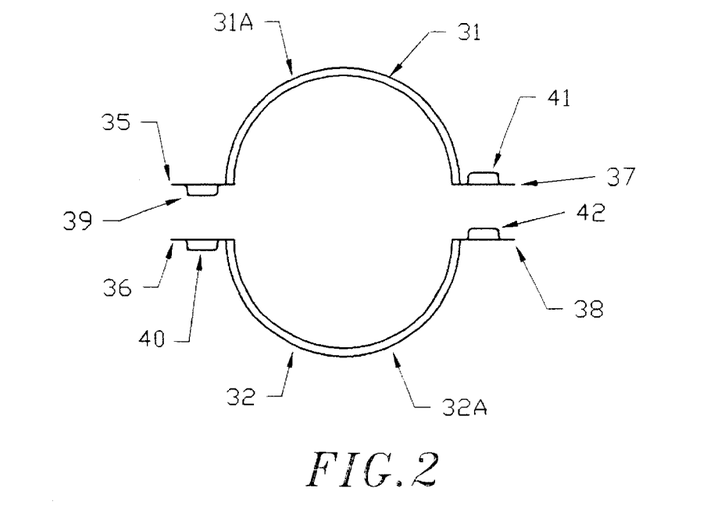
FIG. 2 is a top plan view of the first and second shell portions forming a plant protector as in FIG. 1.
Figure 3:
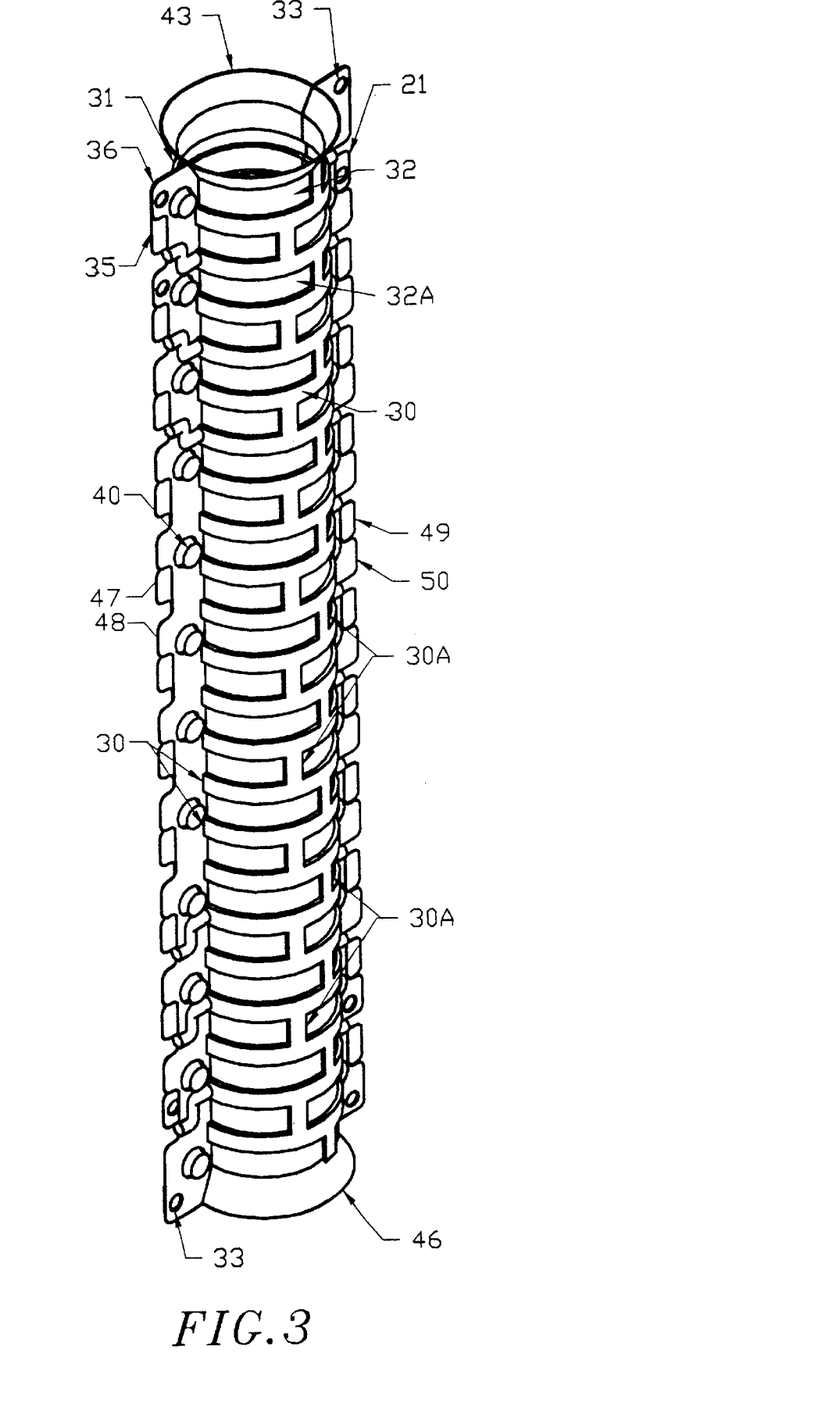
FIG. 3 is a perspective view of a plant protector in accordance with the invention having scalloped edges on each flange and vent tubes.
Figures 4, 5:
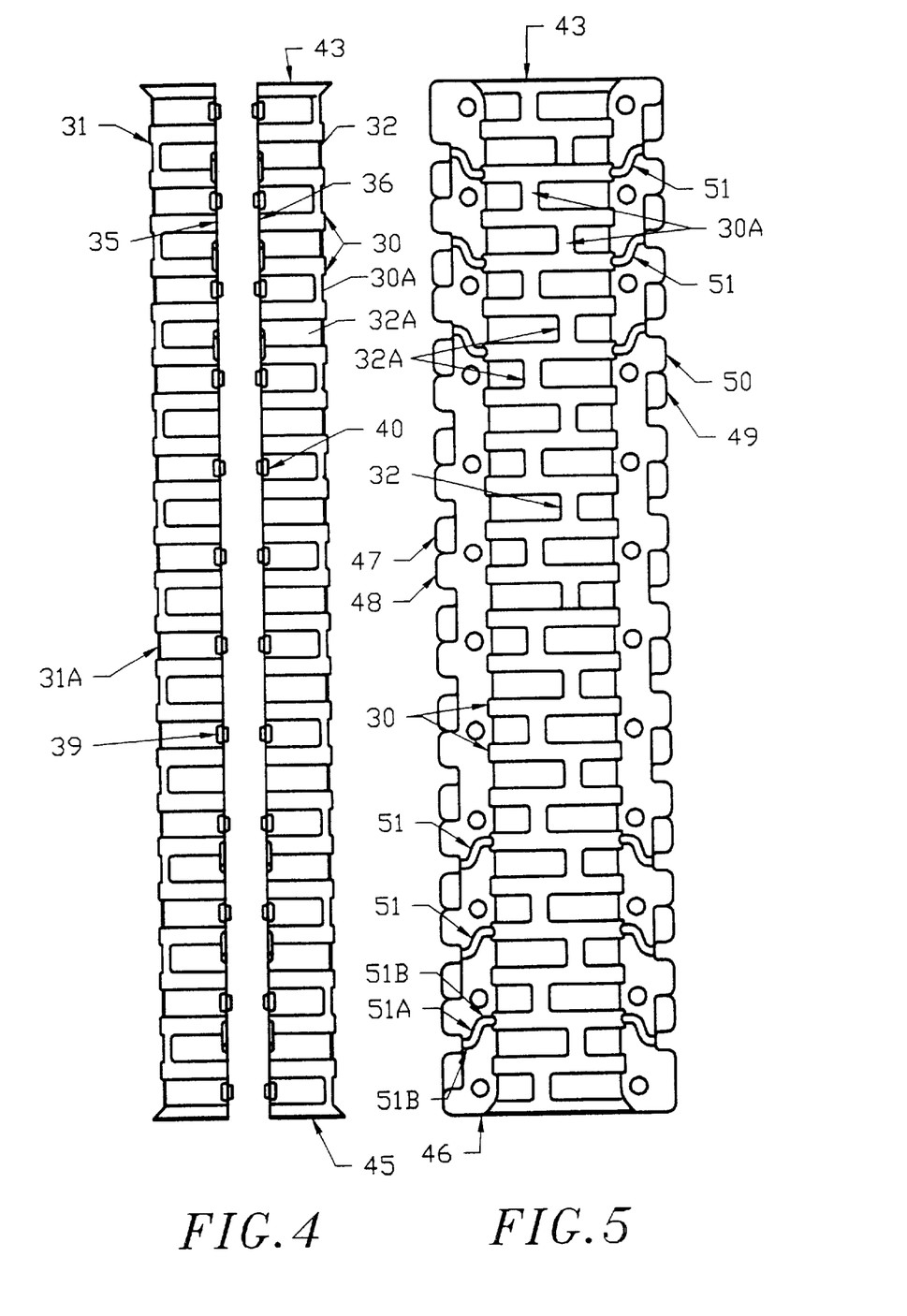
FIG. 4 is a side view of the plant protector of FIG. 3 with the two shells shown separated from each other.
FIG. 5 is a side elevation view of the plant protector of FIG. 3.
Figure 6:
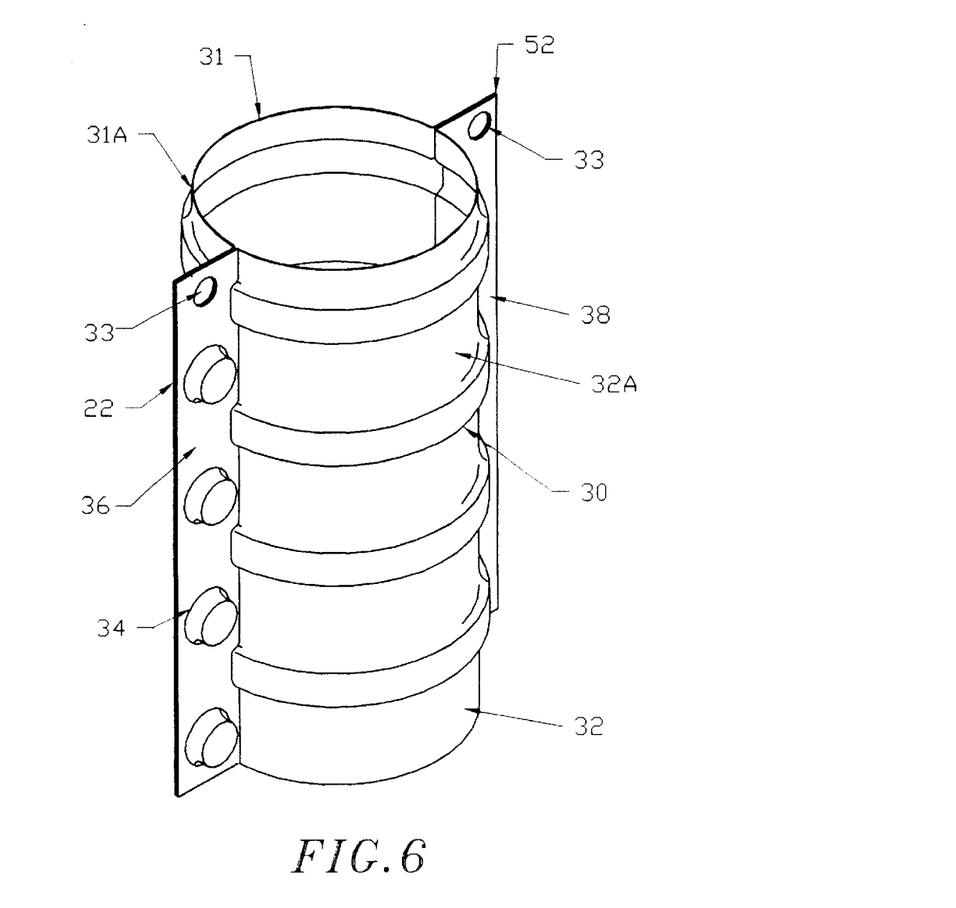
FIG. 6 is a perspective view of a plant protector in accordance with the present invention with a living hinge and a single locking means joining the two shells.
Figure 7:
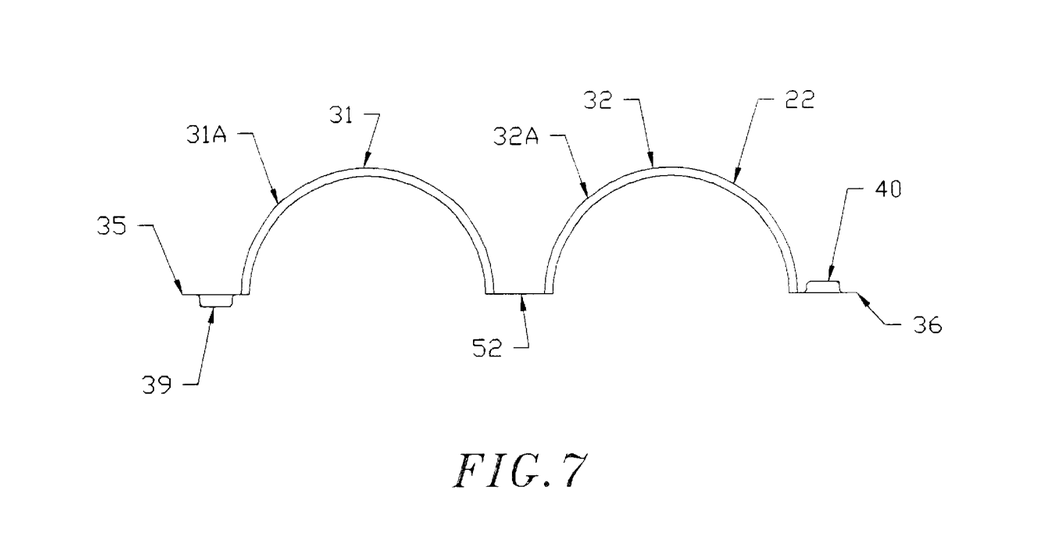
FIG. 7 is a top plan view of the plant protector of FIG. 6 with the two shells forming the plant protector shown in opened position.
Figure 8:
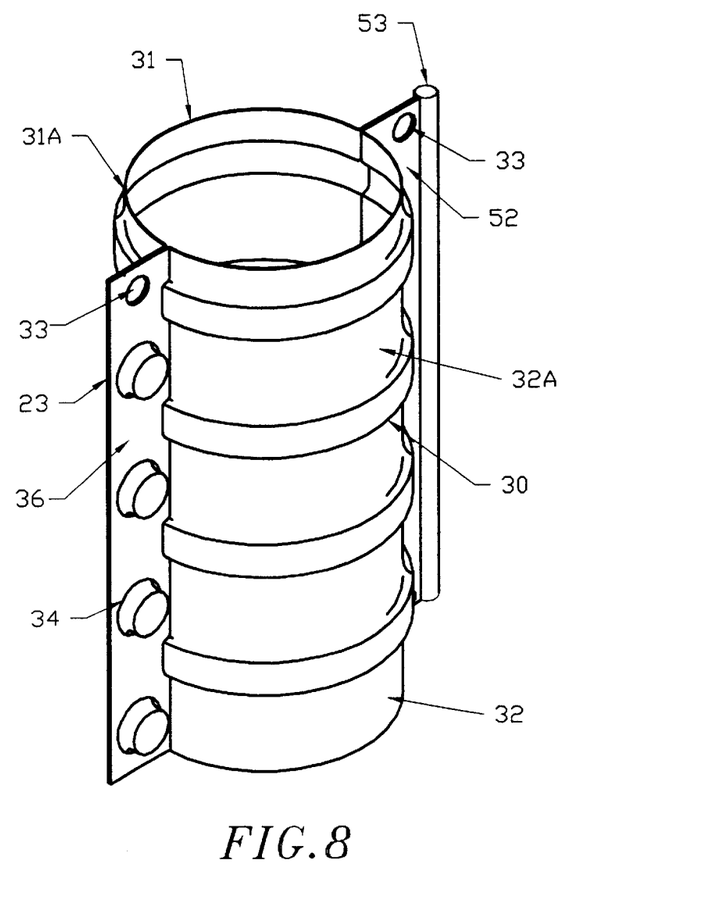
FIG. 8 is a perspective view of a plant protector in accordance with the present invention having a longitudinally raised hinge portion that enhances the durability of the living hinge.
Figure 9:
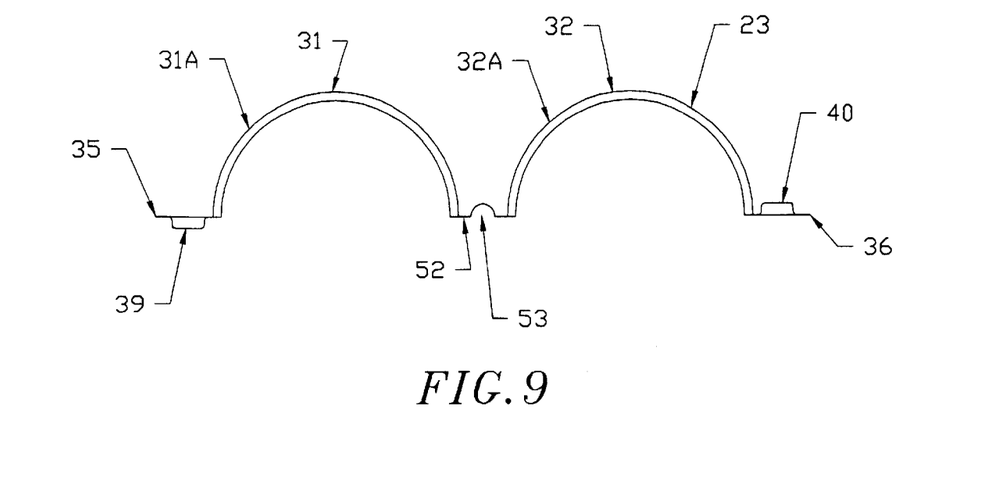
FIG. 9 is a top plan view of the plant protector of FIG. 8.
Figure 10:
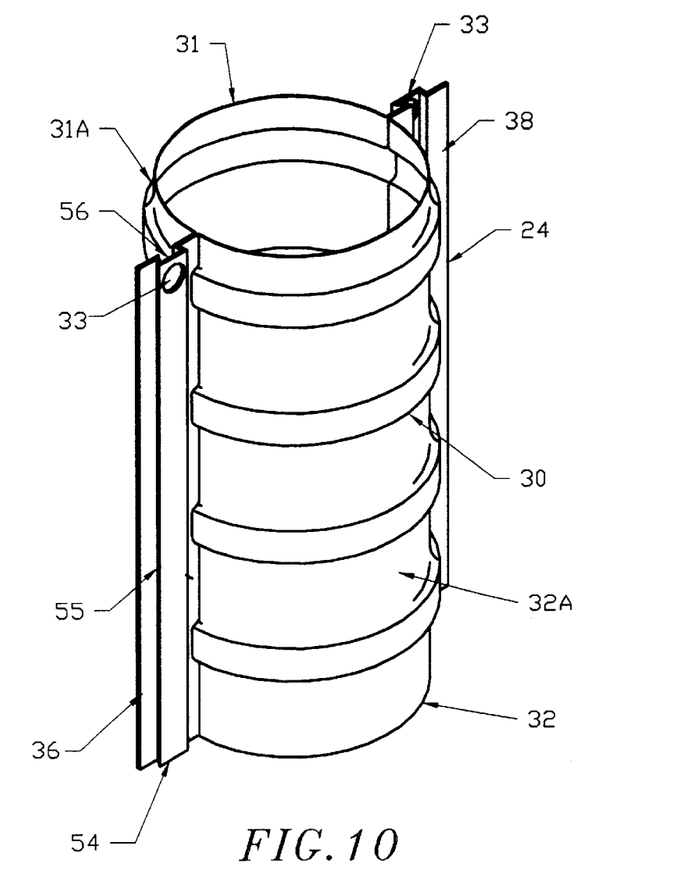
FIG. 10 is a perspective view of a plant protector in accordance with the present invention having a locking means comprising longitudinally extending grooves and mating longitudinally extending ridges formed on the flanges.
Figure 11:
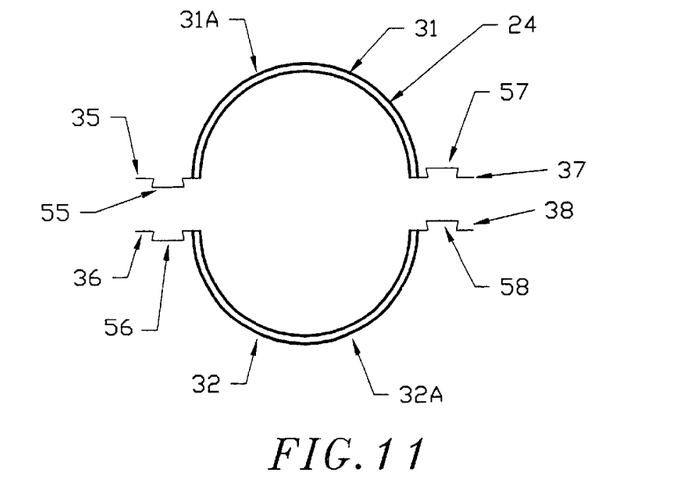
FIG. 11 is a top plan view of the plant protector of FIG. 10 with the two shells separated from each other.
Figure 12:
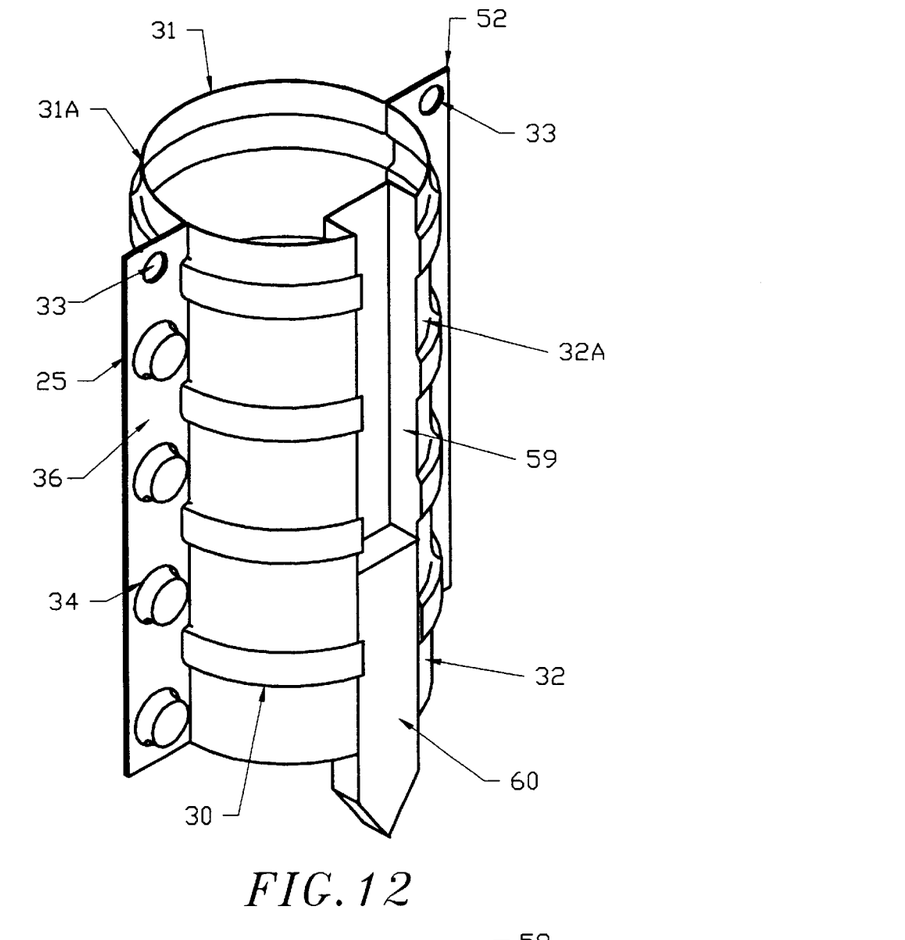
FIG. 12 is a perspective view of a plant protector in accordance with the present invention having a longitudinally extending groove formed on the semi-cylindrical portion of one shell for receiving a stake.
Figure 13:
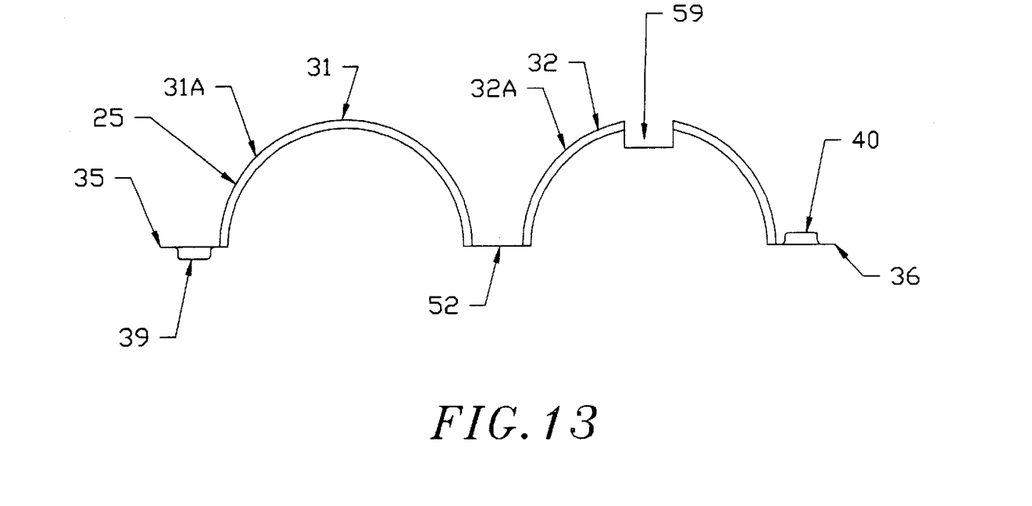
FIG. 13 is a top plan view of the plant protector of FIG. 12 with the two shells separated from each other.
Figure 14:
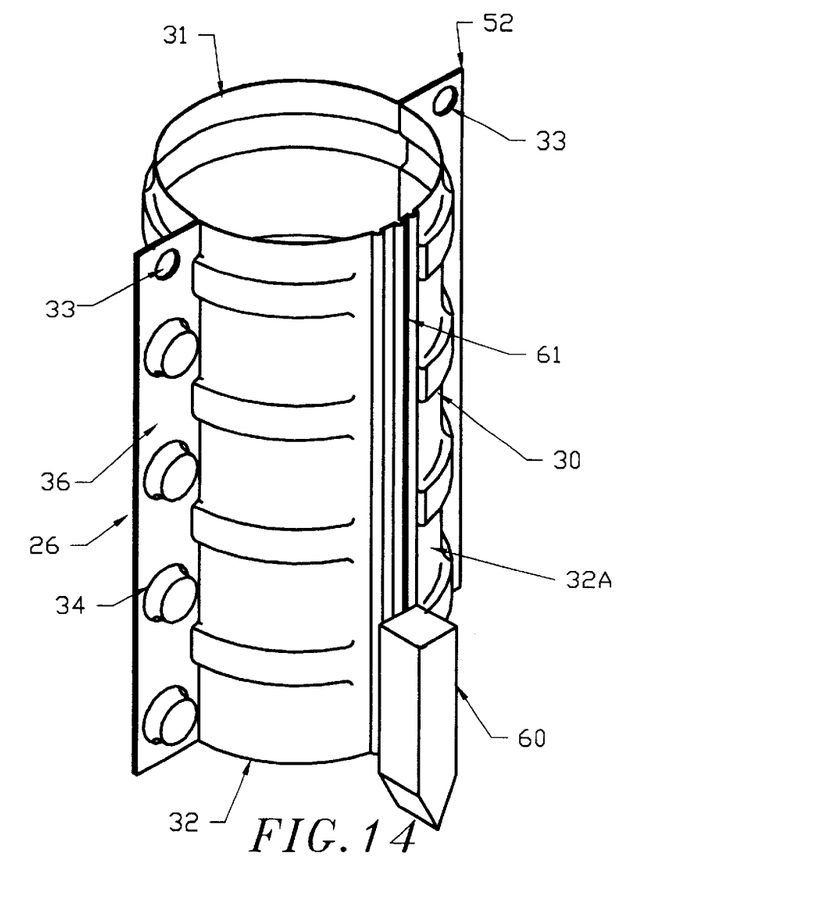
FIG. 14 is a perspective view of a plant protector in accordance with the present invention with longitudinally extending ribs in one of the semi-cylindrical portions of one shell for accepting a security stake.
Figure 15:
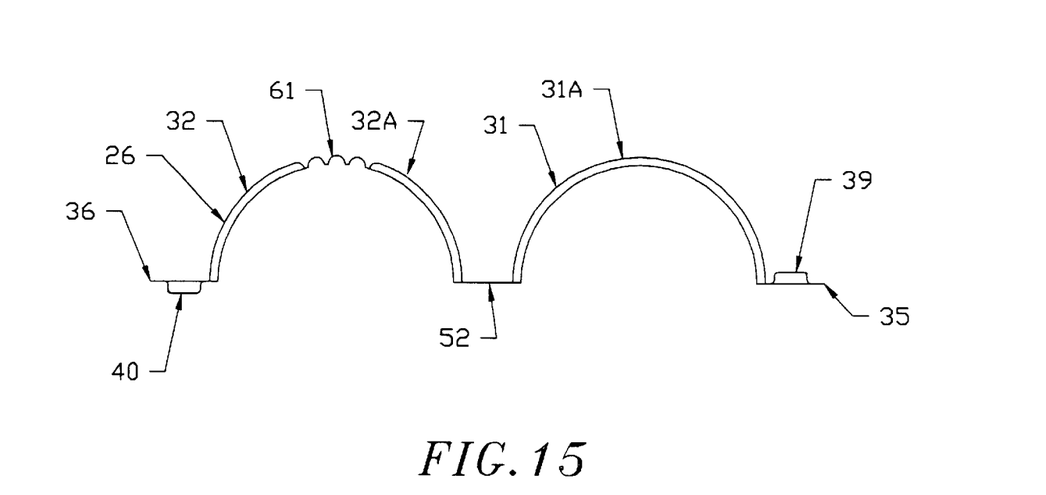
FIG. 15 is a top plan view of the plant protector of FIG. 14 with the two shells separated from each other.
Figure 16:
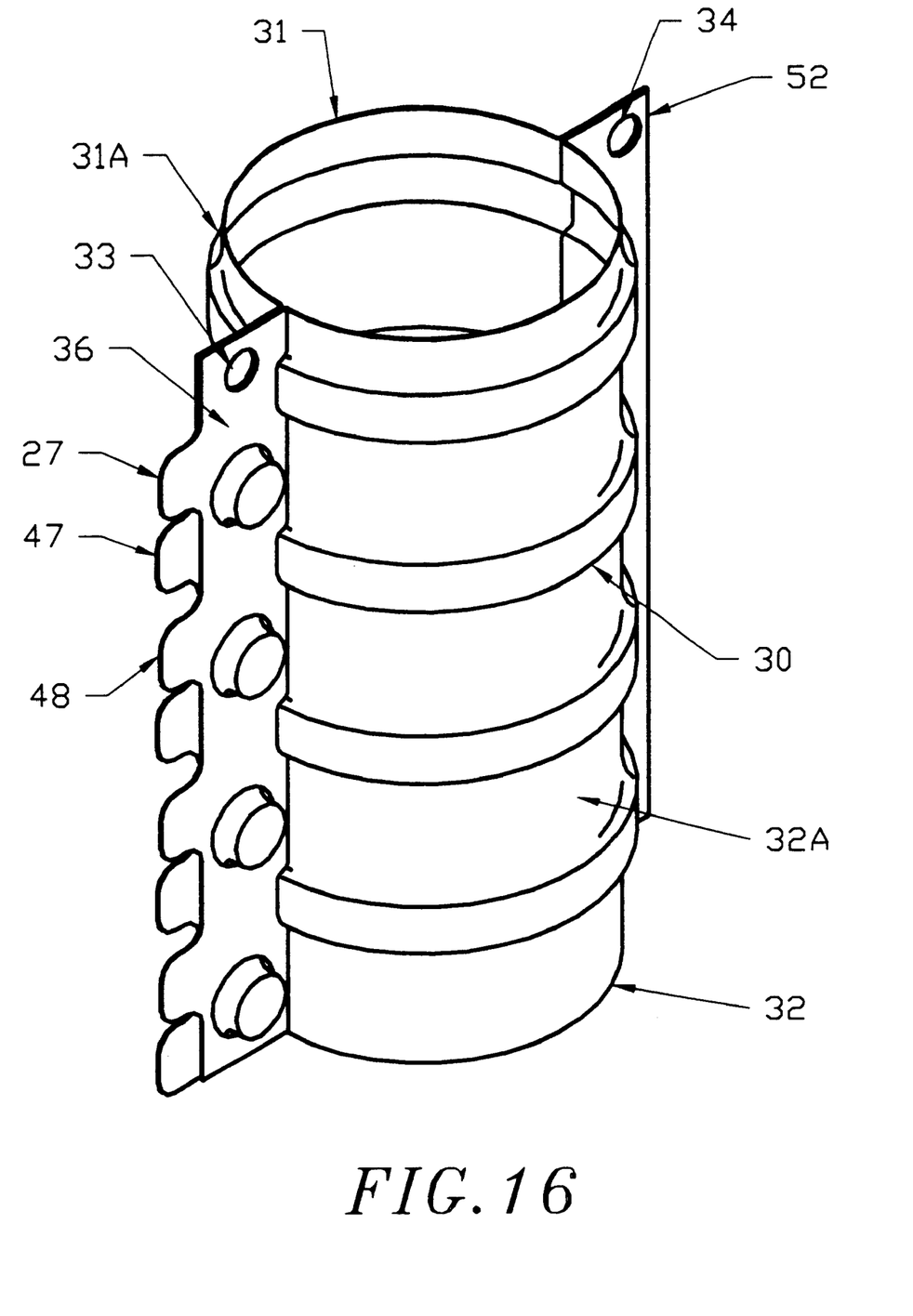
FIG. 16 is a perspective view of a plant protector in accordance with the present invention with scalloped edges along one flange of each shell, and with a living hinge joining the other edge of each shell.
Figure 17:
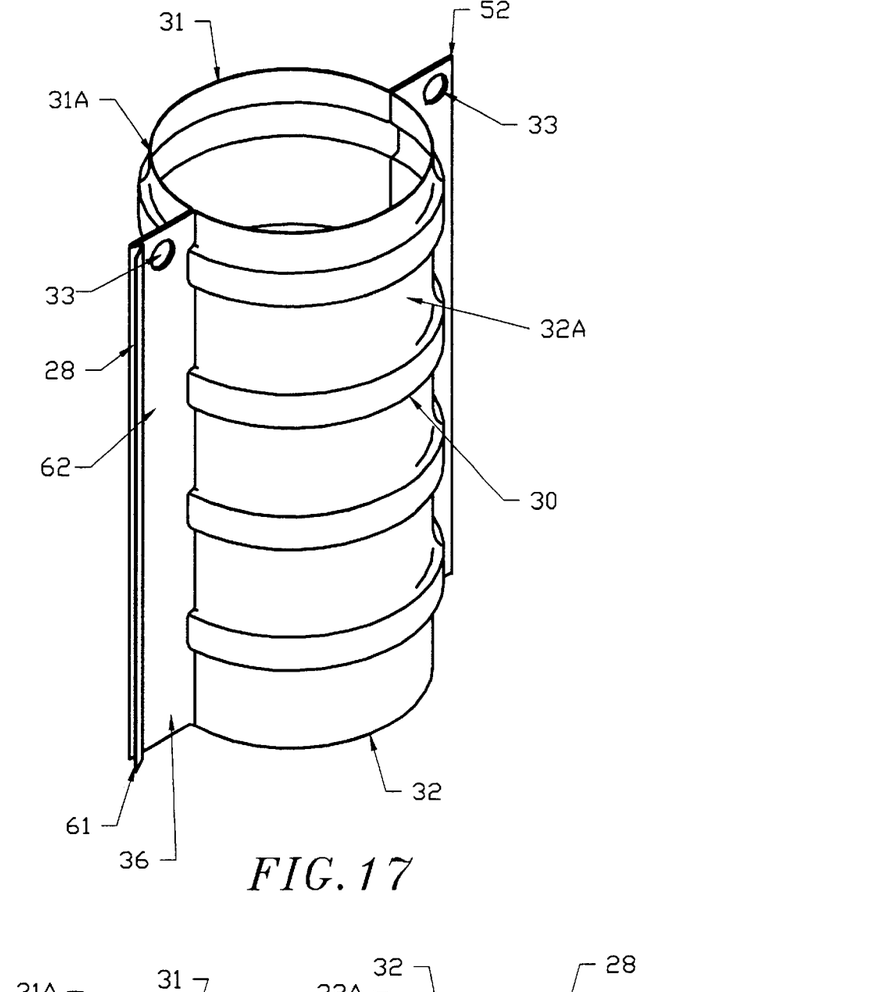
FIG. 17 is a perspective view of a plant protector in accordance with the present invention having a locking means including a lip extending longitudinally along one flange which overlaps an adjacent flange, and with a living hinge joining the other edge of each shell.
Figure 18:
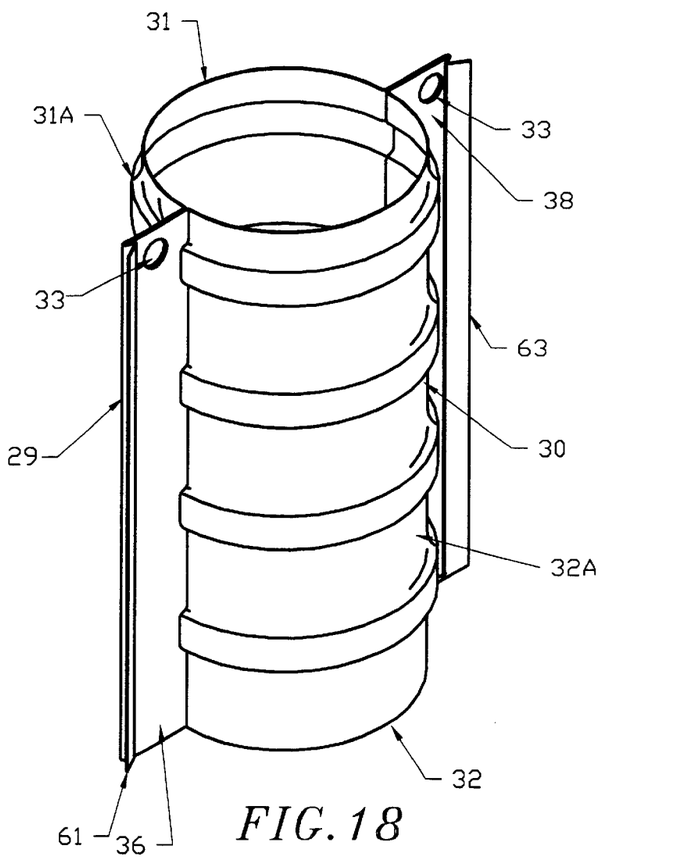
FIG. 18 is a perspective view of a plant protector in accordance with the present invention with a locking means including a lip extending longitudinally along two of the flanges of one shell.
Figure 19:
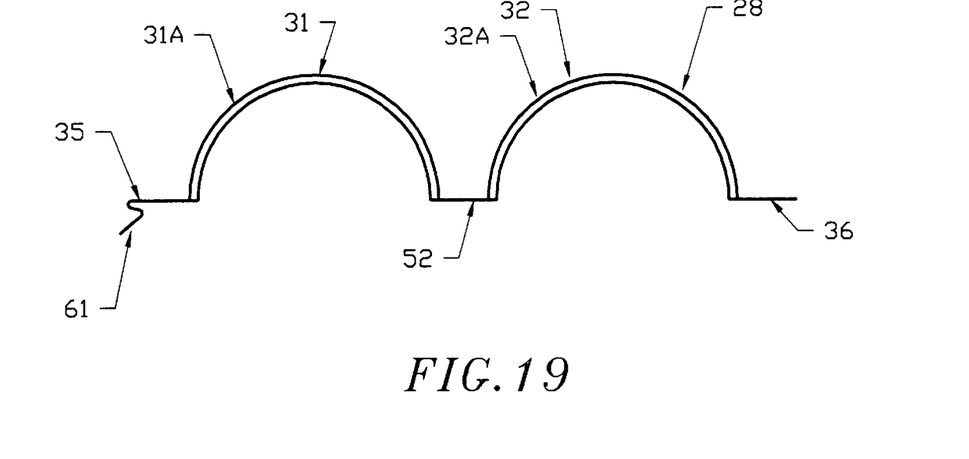
FIG. 19 is a top plan view of the plant protector of FIG. 17 with the two shells separated from each other.
Figure 20:
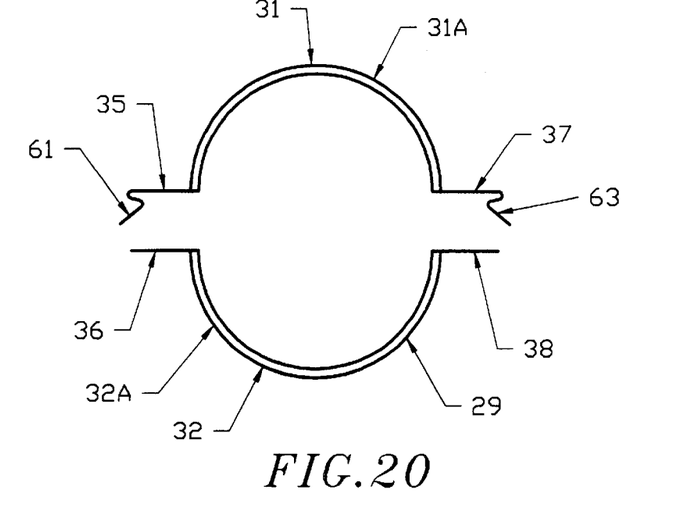
FIG. 20 is a top plan view of the plant protector of FIG. 18 with the two shells separated from each other.

With reference to the drawings, wherein like numerals refer to like parts in each of the several views, a plant protector in accordance with the present invention is shown generally at 20 in FIGS. 1 and 2, at 21 in FIGS. 3–5, at 22 in FIGS. 6 and 7, at 23 in FIGS. 8 and 9, at 24 in FIGS. 10 and 11, at 25 in FIGS. 12 and 13, at 26 in FIGS. 14 and 15, at 27 in FIG. 16, at 28 in FIGS. 17 and 19, and at 29 in FIGS. 18 and 20. Each plant protector 20–29 includes a first shell 31 having a semi-cylindrical portion 31A, a second shell 32 having a semi-cylindrical portion 32A, and flanges 35 and 37 on the first shell and flanges 36 and 38 on the second shell. The flanges 35–38 are preferably formed integrally with and extend radially outwardly from the respective semi-cylindrical portions 31A and 32A of the shells 31 and 32. In the plant protectors 20, 21, 24, and 29 (of FIGS. 1, 3, 10 and 17), the first shell 31 is engaged with the second shell 32 with all of the flanges 35, 36, 37, and 38 engaged together with a locking means 34 in the locked position. In the plant protectors 22, 23, 25, 26, 27, and 28 (of FIGS. 6, 8, 12, 14, 16, and 17), a locking means 34 at one set of abutting flanges is used to lock the first shell 31 to the second shell 32 to form a cylindrical tube from the joined semi-cylindrical portions 31A and 32A, with a hinge 52 being formed at the other set of abutting flanges. The flange 35 of the first shell 31 abuts the flange 36 of the second shell 32, and the flange 37 of the first shell 31 abuts the flange 38 of the second shell 32, when the first shell 31 and the second shell 32 are placed together.

The semi-cylindrical portion 31A is formed as half a cylinder which is joined at both edges of the semi-cylinder with the flanges 35 and 37, and the semi-cylindrical portion 32A is joined at its edges with the flanges 36 and 38. Preferably, raised circumferential ribs 30 are formed integrally in the semi-cylindrical portion 31A perpendicular to the flanges 36–38, and the ribs 30 are spaced apart at regular intervals so as to provide increased strength and rigidity. The ribs 30 preferably face outwardly when the shells come together so as not to interfere with a plant within the protector. The circumferential ribs 30 provide a convenient place for words, phrases or other decoration which may serve as identification, such as serial numbers or addresses.

A locking means 34 is preferably integrally molded on the flanges 35–38. As shown in FIGS. 1–8 and 12–16, the locking means may comprise a boss 39 or a plurality of bosses formed on the flange 35 of the first shell 31, a boss 42 (or several bosses) formed on the flange 38 of the second shell 32, an indentation 40 (or several indentations) formed on the flange 36 of the second shell 32 that mates with the boss 39, and an indentation 41 (or several indentations) formed on the flange 37 of the first shell 31 that mates with the boss 42 formed on second shell 32. Thus, when the shells of the plant protector are locked together, the boss(s) 39 on the first shell 31 and the indentation(s) 40 on the second shell 32 are press engaged, and the mating boss(s) 41 on the first shell 31 and the indentation(s) 42 on the second shell 32 are press engaged so that the first shell 31 and the second shell 32 are locked together and the semi-cylindrical portions 31A and 32A form a cylindrical tube.

Each flange 35–38 may include an aperture 33 which define a hole through the engaged flanges by which the user may mount the plant protector to a stake or may tie the two shell portions more securely together.

Referring now to FIGS. 3–5, the plant protector 21 includes the principal features of the plant protector 20 and additional preferred features. The plant protector 21 includes sections at an upper edge 43 of the first shell 31, at an upper edge 44 of the second shell 32, at a lower edge 45 of the first shell 31, and at a lower edge 46 of the second shell 32, that taper or flare outwardly from the general circumference of the semi-cylindrical portions 31A and 32A. Vertical (or longitudinal) raised ribs 30A extend between the circumferential ribs 30 to provide resistance to vertical compression and to enhance the overall strength and rigidity of the structure. Scalloped edges 47 and 49 are formed on the flanges 35 and 37, respectively, of the first shell 31, and scalloped edges 48 and 50 are formed on the flanges 36 and 38, respectively, of the second shell 32. The outwardmost portions of the scalloped edges 47 and 49 meet with the inwardmost portions of the scalloped edges 48 and 50, and vice versa, so that a user can readily grasp the edges of the abutting flanges to pull the flanges apart and release the locking means. Additionally, a plurality of air vent tubes 51 are formed in the abutting flanges by semi-cylindrical raised portions on the mating flanges 47 and 48 and 49 and 50 of the shells 31 and 32. The vent tubes 51 formed by the mating semi-cylindrical raised portions have an upwardly extending section 51A, as best shown in FIG. 5, in addition to radially inwardly extending sections 51B. The upward section 51A and the generally tortuous path provided by the sections 51A and 51B help to minimize the ability of liquid herbicide to migrate through the vent tubes 51 into the interior of the protector. A plurality of the vent tubes are preferably formed on each side of the protector near the bottom (or at both ends, either of which may be the bottom).

Referring now to FIGS. 6 and 7, a plant protector 22 is shown which additionally includes a living hinge 52 (i.e., an integral section of usually thinner plastic) which is formed at the outermost edges of the flange 37 of the first shell 31 and the flange 38 of the second shell 32, such that the plant protector 22 may be formed of a single piece of vacuum formed plastic. As a result, there is a single locking means 34 comprising at least one boss 39 formed on the flange 35 of the first shell 31 and at least one indentation 40 formed on the flange 36 of the second shell 32. The two shells of the plant protector 22 rotate around the living hinge 52, and the first shell 31 and the second shell 32, when closed on each other, may be held together by the single locking means 34.

FIGS. 8 and 9 show a plant protector 23 which includes the principal features of the plant protector 22 and additionally includes a hinge 52 with a portion 53 that facilitates bending. The portion 53 is a cylindrical integral section of plastic that extends longitudinally along the flanges 37 and 38, and provides added strength and durability for applications in which the plant protector 23 is repeatedly opened and closed.

FIGS. 10 and 11 show a plant protector 24 wherein the locking means 54 comprises longitudinally extending grooves 55 and 58 formed on the flange 35 of the first shell 31 and on the flange 38 of the second shell 32, respectively, and corresponding longitudinally extending ridges 56 and 57 formed on the flange 36 of the second shell 32 and on the flange 37 of the first shell 31, respectively. FIG. 10 shows the locking means 54 when it is in the locked position and FIG. 11 shows the first shell 31 and the second shell 32 when they are uncoupled.

FIGS. 12 and 13 show a plant protector 25, and FIGS. 14 and 15 show a plant protector 26, which each include the principal features of the plant protector 22 and additionally include a longitudinally extending groove 59 formed on the semi-cylindrical portions 31A or 32A of either of shells 31 or 32 in which a stake 60 is placed for securing the plant protector in the ground. FIGS. 14 and 15 show a plant protector 26 which additionally comprises longitudinally extending ribs 61 within the longitudinally extending groove 59 for holding a security stake 60. The groove 59 or the ribs 61 may be in either or both semi-cylindrical portions 31A and 32A. The stake(s) may be used to secure the plant protector 26 so as to prevent rotation or inhibit theft.

FIG. 16 shows a plant protector 27 that includes the principal features of the plant protector 22 and additionally includes a scalloped edge 47 formed on the flange 35 of the first shell 31 which is out of phase with (i.e., outermost and innermost portions of the abutting flanges meet) a scalloped edge 48 formed on the flange 36 of the second shell 32, facilitating the opening and closing of the plant protector 27 by the user in a manner similar to the protector 21 of FIGS. 3–5.

The plant protector 28 which is shown in FIGS. 17 and 19 has a single locking means 62 which comprises a longitudinally extending lip 61 on the flange 35 of the first shell 31 that is folded over the edge of the flange 36 of the second shell 32 to lock the first shell 31 and the second shell 32 together. A living hinge 52 is formed at the other ends of the semi-cylindrical portions 31A and 32A. The plant protector 29, which is shown in FIGS. 18 and 20, has an additional locking means 63 comprising a longitudinally extending lip 63 formed on the flange 37 of the first shell 31 which is folded over the edge of the flange 38 of the second shell 32 to lock the first shell 31 and the second shell 32 together.

Each of the plant protectors 20–29 in accordance with the present invention is preferably made of a vaccum formed molded plastic, for example, vacuum formed polystyrene, which allows structures such as hinges, locking means, vent tubes and ribs to be easily and integrally formed. Colorants may be added to the plastic material, as desired, to provide additional protection against harmful light wavelengths and/or to enhance the effectiveness of the plant protector as a mini-greenhouse. However, the invention is not limited to such processes or materials.

It is understood that this invention is not confined to the particular construction and arrangement of parts herein illustrated and described, but embraces all such modified forms thereof as come within the scope of the following claims.

What is claimed is:

1. A plant protector comprising:
   (a) first and second shells each formed of a rigid material and having a semi-cylindrical shaped portion, flanges extending outwardly from and running longitudinally along the semi-cylindrical shaped portions, and raised circumferential ribs in the semi-cylindrical shaped portion of each shell which are spaced apart at regular intervals so as to provide strength and rigidity and which face outwardly when the shells come together, and such that the semi-cylindrical portions form a cylindrical tube when the shells are engaged together at the flanges;

(b) locking means formed on at least one of the flanges of the shells for releasably locking the first shell to the second shell; and (c) raised vent tube portions in abutting flanges that together form at least one vent tube extending from the outer edges of the flanges to the interior of the protector, the vent tube poritons having an upwardly extending section and radially inwardly extending sections to provide a tortuous path in the vent tube.

2. A plant protector comprising:

(a) first and second shells each formed of a rigid vacuum formed plastic and having a semi-cylindrical shaped portion, flanges extending outwardly from and running longitudinally along the semi-cylindrical portions, such that the flanges abut and the semi-cylindrical portions form a cylindrical tube when the shells are engaged together;

(b) mating bosses and the indentations formed on the flanges on opposite sides of the first and second shells which press engage one another when the flanges are pressed together to thereby releasably lock the shells together; and (c) raised vent tube portions in abutting flanges that together form at least one vent tube extending from the outer edges of the flanges to the interior of the protector, the vent tube portions having an upwardly extending section and radially inwardly extending sections to provide a tortuous path in the vent tube.

3. The plant protector of claim 2 wherein the vent tube has an upwardly extending section.

4. The plant protector of claim 3 wherein there are a plurality of vent tubes formed on the flanges of the protector at a position near a bottom end of the protector.

5. A plant protector, comprising:

(a) first and second shells each formed of a rigid vacuum formed plastic and having a semi-cylindrical shaped portion, flanges extending outwardly from and running longitudinally along the semi-cylindrical portions, such that flanges abut and the semi-cylindrical portions form a cylindrical tube when the shells are engaged together;

(b) mating bosses and indentations formed on the flanges on opposite sides of the first and second shells which press engage one another when the flanges are pressed together to thereby releasably lock the shell portions together; and (c) wherein the flanges on the first and second shells have scalloped edges and wherein an outwardmost edge of one flange meets an inwardmost edge of an abutting flange so that the flanges can be easily gripped to draw the shells apart or bring the flanges together.

6. A plant protector, comprising:

(a) first and second shells each formed of a rigid material and having a semi-cylindrical shaped portion, and flanges having scalloped edges that extend outwardly from and longitudinally along the semi-cylindrical portions, wherein an outwardmost edges of one scalloped flange meets an inwardmost edge of the abutting scalloped flange so that the flanges can be easily gripped to draw the shells apart or bring the flanges together, the semi-cylindrical portions forming a cylindrical tube when engaged together; and (b) locking means on the flanges of the shells for releasably locking the first shell portion to the second shell portion.

7. The plant protector of claim 6 wherein the rigid material is vacuum formed plastic.

8. The plant protector of claim 6 wherein the semi-cylindrical portions have raised circumferential ribs formed therein.

9. A plant protector, comprising:

(a) shells each formed of a rigid material and flanges extending outwardly from and running longitudinally along the shells such that the shells form a cylindrical tube when engaged together;

(b) locking means formed on at least one of the flanges of the shells for releasably locking the shells together; and (c) raised vent tube portions in abutting flanges that together form at least one vent tube extending from the outer edges of the flanges to an interior of the protector, the vent tube portions having an upwardly extending section and radially inwardly extending sections to provide a tortuous path in the vent path.

* * * * *